United States Patent [19]

Takla et al.

[11] Patent Number: 4,718,034

[45] Date of Patent: Jan. 5, 1988

[54] CARRY-SAVE PROPAGATE ADDER

[75] Inventors: Nabil Takla, San Jose, Calif.; Mark Hecker, Northborough, Mass.; Robert Murdoch, Sacramento, Calif.; Raymond Chu, Milpitas, Calif.; Rajesh Parekh, San Jose, Calif.

[73] Assignee: Data General Corporation, Westboro, Mass.

[21] Appl. No.: 670,401

[22] Filed: Nov. 8, 1984

[51] Int. Cl.[4] .......................... G06F 7/50; G06F 7/52
[52] U.S. Cl. ..................................... 364/784; 364/760
[58] Field of Search ................ 364/784, 785, 786, 760

[56] References Cited

U.S. PATENT DOCUMENTS

| | | | |
|---|---|---|---|
| 3,646,332 | 2/1972 | Suzuki | 364/784 |
| 3,843,876 | 10/1974 | Fette et al. | 235/175 |
| 4,031,379 | 6/1977 | Schwartz | 364/786 |
| 4,422,157 | 12/1983 | Uhlenhoff | 364/786 |
| 4,546,446 | 10/1985 | Machida | 364/760 |
| 4,547,863 | 10/1985 | Colardelle | 364/784 |
| 4,563,751 | 1/1986 | Barker | 364/786 |
| 4,564,921 | 1/1986 | Suganuma | 364/784 |

FOREIGN PATENT DOCUMENTS

2019621A 3/1979 United Kingdom .
2128781A 9/1983 United Kingdom .

Primary Examiner—David H. Malzahn
Attorney, Agent, or Firm—Limbach, Limbach & Sutton

[57] ABSTRACT

A carry-save propagate adder employing two exclusive-OR blocks, a multiplexer block for selecting between a carry propagate input or a carry-save input, and a further multiplexer block for supplying as a carry-save output either the carry-save input or one of the data inputs.

10 Claims, 12 Drawing Figures

```
                                        MULTIPLICAND
                                        MULTIPLES
                  X₀ X₁ X₂ X₃            ──────────────
MULTIPLICAND (MCND) - 1  0  0  1         0X | 0 0 0 0 0
                                         1X | 0 1 0 0 1
                  Y₀ Y₁ Y₂ Y₃            2X | 1 0 0 1 0
MULTIPLIER (MPLR) - 1  0  1  1           3X | 1 1 0 1 1
```

FIRST ADD:

FIRST MCND/MPLR VALUE: Y₂Y₃ = 11₂ (∴3X VALUE) -
CARRY SAVE IN INITIALLY ALL ZEROS -
PRINCIPAL SUM IN INITIALLY ALL ZEROS -

| INPUT | VALUE |
|---|---|
| B:   | 1 1 0 1 1 – – – – |
| CS_I: | 0 0 0 0 0 – – – – |
| A:   | 0 0 0 0 0 – – – – |
| PS_O: | 1 1 0 1 1 – – – – |
| CS_O: | 0 0 0 0 0 – – – – |

SHIFT/SECOND ADD:

SECOND MCND/MPLR VALUE Y₀Y₁ = 10 (∴2X VALUE) -
CARRY SAVE FROM FIRST ADD, SHIFTED BY ONE -
PRINCIPAL SUM FROM FIRST ADD, SHIFTED BY TWO -

| | |
|---|---|
| B:   | 1 0 0 1 0 – – – – |
| CS_I: | – 0 0 0 0 0 – – – |
| A:   | – – 1 1 0 1 1 – – |
| PS_O: | 1 0 1 0 0 1 1 – – |
| CS_O: | 0 0 0 1 0 0 0 – – |

FINAL ADD: (CARRY PROPAGATE)

| | |
|---|---|
| B:       | 0 0 0 0 0 – – – – |
| CARRY IN: | – 0 0 0 1 0 0 0 – |
| A:       | – – 1 0 1 0 0 1 1 |
|          | 0 0 1 1 0 0 0 1 1 |

CARRY-SAVE PROPAGATE ADDER

DESCRIPTION

1. Technical Field

The present invention is directed, in general, to apparatus for performing arithmetic operations on binary numbers, and in particular to a carry-save propagate adder.

2. Background Art

In the past, binary adders were implemented in accordance with a standard configuration which employed a large number of combinatorial logic gates. While such a configuration was satisfactory given the physical size expectations of the period, the recent trend in digital circuitry is to minimize the number of combinatorial logic gates required for implementing a particular arithmetic function, reduce the overall physical area required to implement a particular arithmetic function, and increase the speed with which the arithmetic operation can be accomplished. As higher circuit densities are sought more efficient circuit implementations are required.

DISCLOSURE OF INVENTION

These and other problems and disadvantages of previous binary adder circuits are overcome by the present invention of a binary adder which provides both carry-save and carry-propagate operations upon first and second bits of binary data and a carry bit of binary data to yield a sum output and a carry-save or a carry-propagate output. The binary adder includes first logic means coupled to receive the first and second bits of binary data for providing an output which is the logical exclusive-OR of said first and second bits. The first logic means include means for providing an output which is the logical NOR of said first and second bits. First multiplexer means are provided which are responsive to the carry-save and carry-propagate commands and coupled to receive the carry-save bit and the carry-propagate bit for providing the carry-save bit as an output in the presence of the carry-save command, and to provide the carry-propagate bit as an output in the presence of the carry-propagate command. Also included are second multiplexer means coupled to the first logic means and coupled to receive one of the first and second bits of data and to receive the carry-save bit of binary data for providing the one of the first and second bits or the carry-save bit as the carry-save output in accordance with the logic state of the output of the first logic means. Second logic means are provided which are coupled to the first logic means and to the first multiplexer means for providing the sum output of the adder wherein the sum output is the logical exclusive-OR of the output of the first logic means and the output of the first multiplexer means. Finally, carry-propagate output means are provided and are coupled to the first logic means and receive the carry-propagate bit. The carry-propagate output means supply either the carry-propagate bit or predetermined logic states as the carry-propagate output in accordance with the logic states of the outputs of the logical NOR means and the first logic means.

In accordance with the present invention, the number of combinatorial logic gates which are required to implement the above-described structure is greatly reduced over that required in the prior art. Part of this reduction is achievable because portions of the combinatorial logic are shared between the carry-propagate add and the carry-save add functions. Further reduction is achieved by using a multiplexing arrangement to generate the carry-save output.

In accordance with the present invention, the implementation of either a carry-propagate function or a carry-save function is similarly simplified over that of the prior art. Thus, a comparison of the carry-save portion of the present invention to that of prior art structures will reveal that smaller physical size and lower component counts are achievable by the structure of the present invention. The same is true for the carry-propagate portion of the present invention.

In the preferred embodiments of the present invention the first and second multiplexer means are implemented by positioning transistor switches in the signal paths for the data sought to be selected. Application of control signals to the transistor switches determine whether the data is passed on to the output of the multiplexer or prevented from passing thereto.

Also, in the preferred embodiment of the present invention metal oxide semiconductor circuits are utilized to minimize power requirements and to simplify the implementation of the present invention. This permits selected data paths to be precharged so that any inherent delays due to parasitic or turn-on/turn-off capicitances can be overcome.

It is therefore an object of the present invention to provide a binary adder which has a lower parts count in implementation as compared to the prior art.

It is another object of the present invention to provide a binary adder which includes carry-save and carry-propagate functions, wherein the implementation of such functions share common logic circuits.

It is a further object of the present invention to provide a binary adder which implements carry-save and carry-propagate functions wherein the carry-save output is selected as either the logic state of the carry-save input or the logic state of one of the adder input bits to be added depending upon the logical exclusive-OR of the adder input bits to be added.

These and other objectives, features and advantages of the present invention will be more readily understood upon considering the following detailed description of certain preferred embodiments of the present invention and the accompanying drawings.

BRIEF DESCRIPTION OF THE DRAWINGS

FIG. 11 is an example of a multiplication operation.

BEST MODE FOR CARRYING OUT THE INVENTION

Figure 1:
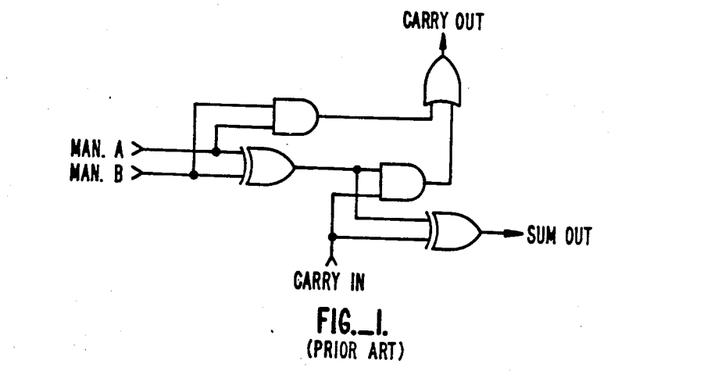
FIG. 1 is a schematic representation of a full adder of the prior art.

FIG. 1 illustrates a circuit structure of the prior art for implementing a binary full adder. As can be seen from the Figure combinatorial logic gates are required for such implementation. This includes two exclusive-OR gates, two AND gates, and an OR gate. The exclusive-OR gates, themselves, are often implemented by a number of combinatorial logic gates.

Figure 2:
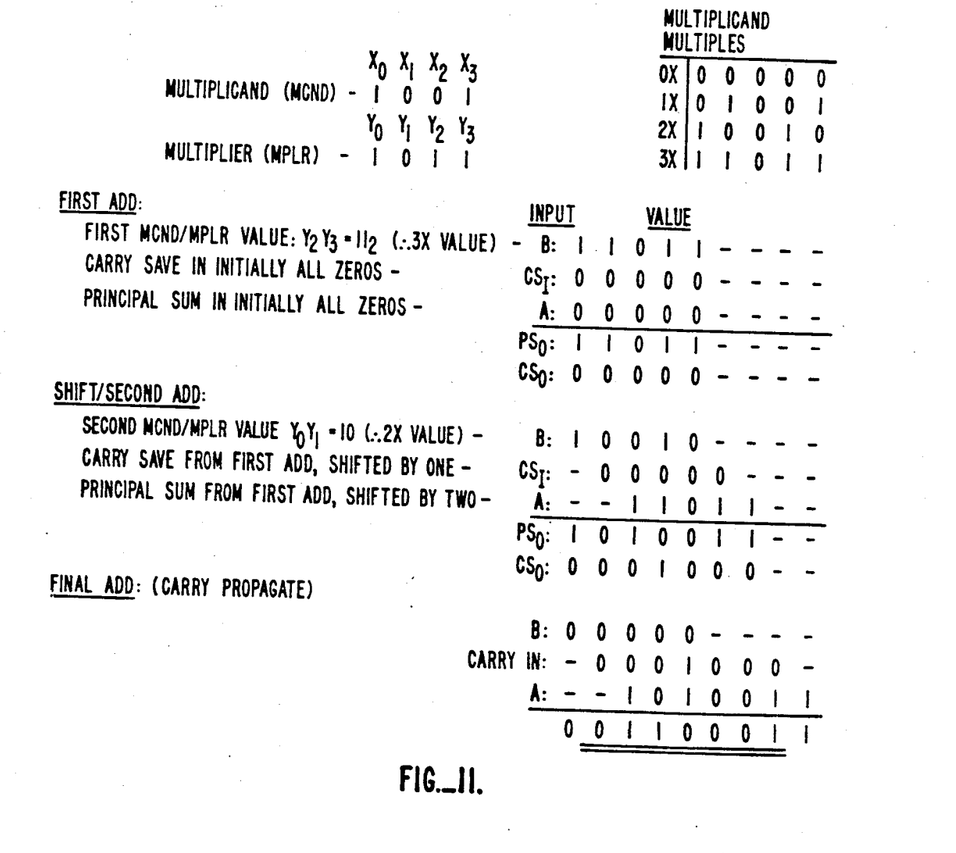
FIG. 2 is a simplified functional block diagram of the present invention.
Figure 3:
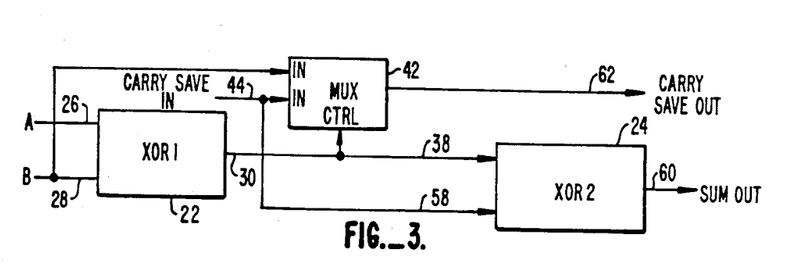
FIG. 3 is a simplified functional block diagram of the carry-save portion of the present invention.
Figure 4:
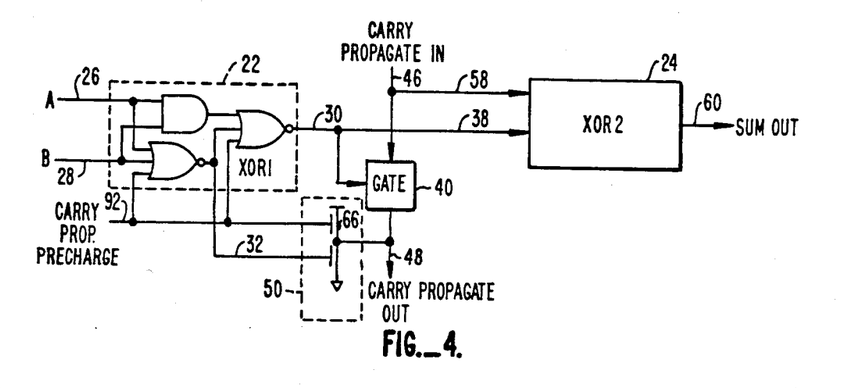
FIG. 4 is a simplified functional block diagram of the carry-propagate portion of the present invention.

Referring to FIGS. 2-4, it can be seen that the present invention utilizes, in conjunction with exclusive-OR gates, multiplexers and simple switches to achieve a full adder function as well as the carry-save function. The difference in component count between previous adders and that provided by the present invention will be realized upon consideration of FIG. 5 to be discussed in a following section.

Generally, the binary adder of the present invention utilizes two exclusive-OR blocks 22 and 24. Exclusive-OR block 22 receives at its inputs 26 and 28 the two binary bits, adder input A and adder input B, which are to be operated upon. The output 30 of exclusive-OR block 22 provides a logic level which is the logical exclusive-OR of the adder input bits.

Also provided by exclusive-OR block 22 is an output 32 which provides a logic state that is the logical NOR of the input bits. Exclusive-OR block 22 of FIG. 2 illustrates one implementation of the requisite exclusive-OR function whereby a logical NOR output can also be provided. A NOR gate 34 and an AND gate 37 both receive adder input bits A and B. A NOR gate 36 receives the outputs of NOR gate 34 and AND gate 37. NOR gate 36 provides the exclusive-OR output 30 of exclusive-OR block 22. NOR gate 34 provides the logical NOR output 32.

Output 30 of exclusive-OR block 22 is coupled to input 38 of exclusive-OR block 24, to gate 40, and to the control input of multiplexer 42. The logic level from output 30 of exclusive-OR block 22 controls the state of gate 40 and multiplexer 42.

Multiplexer 42 receives inputs from one of the adder input data bits, in this case input B, and the carry-save input on line 44. Multiplexer 42 provides the carry-save input state at its output whenever the output of exclusive-OR block 22 is at a logic one level. When the output of exclusive-OR block 22 is at a logic zero level, multiplexer 42 provides adder input bit B as its output.

Gate 40 controls the data path between the carry propagate input 46 and the carry-propagate output 48. When exclusive-OR block 22 outputs a logic one level, gate 40 connects carry-propagate input 46 to carry-propagate output 48. Conversely, when the output of exclusive-OR block 22 is a logic zero, carry-propagate input 46 is decoupled from carry-propagate output 48.

The carry-propagate output 48 is controlled not only by whether or not gate 40 is opened or closed, but also by the state of gate 50. As can be seen from FIG. 2, gate 50 connects to carry-propagate output 48 and is controlled by output 32 from exclusive-OR block 22. Carry propagate precharge line 92 permits carry propagate output 48 to be precharged to a logic one state. When a logic one level is present at output 32, gate 50 forces carry-propagate output 48 to a logic zero level. For a logic zero level at output 32, gate 50 acts only to precharge carry-propagate output 48. As such, the state of carry-propagate output 48 changes only if gate 40 is enabled and there is a logic zero on carry propagate input 46.

In the upper center of FIG. 2, multiplexer 52 is illustrated as receiving the carry-propagate input bit, line 46, and the carry-save input bit, line 44, as inputs. Multiplexer 52 is controlled by carry-propagate add command, received on line 54, and by carry-save add command, received on line 56. Depending upon which of the commands is asserted, multiplexer 52 supplies at its output either the carry-propagate input bit or the carry-save input bit. The output of multiplexer 52 is shown connected to input 58 of exclusive-OR block 24. Exclusive-OR block 24 thus provides at its output 60 a level which is representative of the logical exclusive-OR of the output of multiplexer 52 and the output of exclusive-OR block 22. This output is the sum output 60 of the present invention.

Finally, the carry-save output 62 of the present invention is defined as the output of multiplexer 42 by way of shift register 64. Shift register 64 is utilized in the preferred embodiment of the present invention in order to provide the appropriate shifting and delay required for implementing a carry-save addition operation as part of a multiplication scheme.

Referring to FIG. 3, a simplified version of the carry-save circuit of the present invention is provided in order to more clearly illustrate the carry save structure. In this diagram it is assumed that the control line 56 for the carry save operation has been asserted and that multiplexer 52 is supplying the carry-save input, from line 44, to input 58 of exclusive-OR block 24.

In a carry-save mode, the carry is held in the adder block for use at a later time, as opposed to being propagated onto the next higher adder block. In operation, exclusive-OR block 22 and exclusive-OR block 24 operate together to define the sum output 60 of the adder, while multiplexer 42 selects from either: (1) one of the adder input bits, or (2) the carry-save input bits, to supply the carry-save output as a function of the output of exclusive-OR block 22.

Conceptually, it can be shown that multiplexer 42 can be used to select the appropriate carry-save output. When the output of exclusive-OR block 22 is a logic one, the logic state of the carry-save output will be determined only by the logic state of the carry-save input. Thus, multiplexer 42 is configured to select the logic state from line 44 as its output state when the logic level applied to its control input is a logic one.

Similarly, where the output exclusive-OR gate 22 is a logic zero, this indicates that the adder inputs are the same and also that the logic state of the carry-save output will be determined only by the logic state of either one of the adder inputs.

For example, where both adder inputs A and B are at a logic one level, there will be a carry-save output of a logic one, regardless of what the carry-save input is. The carry-save input, in this case, will only effect the logic state of the sum output 60. Conversely, where adder inputs A and B are both logic zero, there can be no logic one state in the carry-save output, even if the carry-save input is a logic one value.

Thus, the output of exclusive-OR block 22 controls which of the inputs to multiplexer 42 are selected for output thereby. By utilizing a multiplexer to provide the carry-save output selection function, substantial savings can be realized in the number of combinatorial logic gates required to implement the binary adder of the present invention.

Referring to FIG. 4, the carry-propagate operation of the present invention is illustrated in simplified detail. As before, it is assumed that the appropriate functional control line is asserted, in this case the carry-propagate add control line 56, FIG. 2, so that multiplexer 52 supplies the appropriate signal to input 58 of exclusive-OR block 24.

As a matter of background, in the carry-propagate mode the adder block receives adder input bits A and B and also a carry-propagate input bit. The logical state of the carry-propagate input bit is determined by the result of the addition operation of the adder block operating upon the next lower significant bits of the data being added. In turn, the carry-propagate input bit and the adder input bits A and B are added together to produce a sum output at output 60, and a carry-propagate output at output 48. The carry propagate output is then permitted to propagate to the next higher stage of the adder block.

As before, exclusive-OR block 22 and exclusive-OR block 24 provide the sum output 60.

The carry-propagate output is supplied through gates 40 and 50, which in turn are controlled by the output 30 of exclusive-OR block 22 and the output 32 of the logical NOR function in exclusive-OR block 22. Conceptually, when the output of exclusive-OR block 22 is a logic one, thus causing gate 40 to connect line 46 to line 48, it can be shown that the logic state of the carry-propagate output will be determined by the carry-propagate input 46, and will in fact correspond to the logical state of carry-propagate input 46.

On the other hand, it can be shown that when the output of exclusive-OR block 22 is a logic zero the carry-propagate output logic state is related to the logical NOR of the input bits A and B. For example, if input bits A and B are both a logic zero there can be no carry-out, regardless of the logic state of the carry-propagate input bit. Note that the logical NOR of input bits A and B is a logic one state. When this logic one state is applied to gate 50, gate 50 will be operable to force carry-propagate output 48 to a logic zero level.

Conversely, when inputs A and B are both at a logic one state there will be a logic one carry-propagate output. Gate 50 includes a precharge circuit 66 which precharges the carry-propagate output 48 to a logic one level prior to the adder operation. This precharging operation is enabled by assertion of carry propagate precharge line 92. When the output 32 of exclusive-OR block 22 is a logic zero, this precharged condition is permitted to remain, subject to being discharged if a logic zero level is present at the carry propagate input 46 and if gate 40 is enabled. In the present example, gate 40 is disabled when adder inputs A and B are both at a logic one state. Thus carry-propagate output 48 will be at a logic one level.

Figure 5:
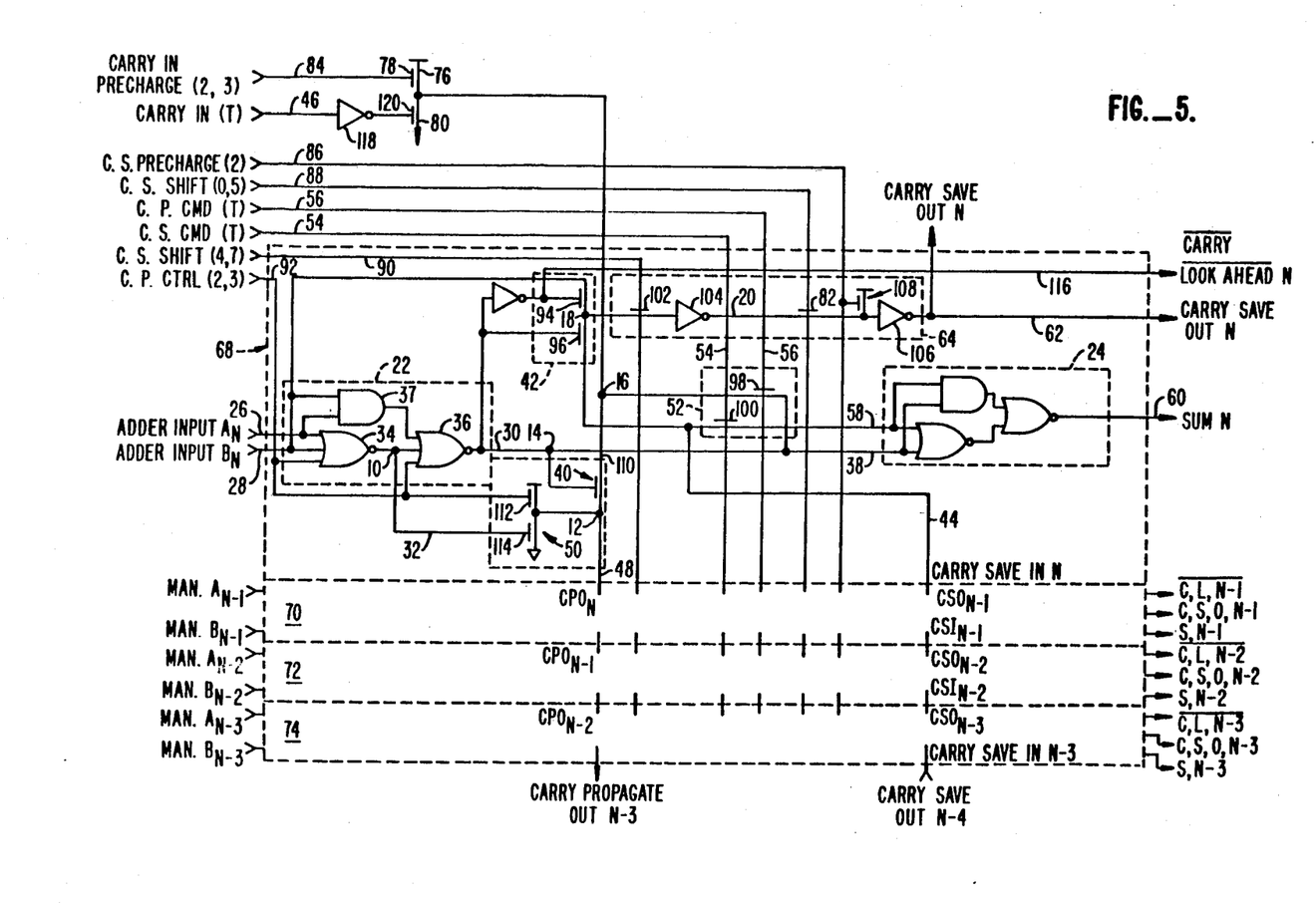
FIG. 5 is a detailed schematic of the present invention.

Referring now to FIG. 5, the structure of the present invention will be described in greater detail. FIG. 5 illustrates a 4 bit carry-save propagate adder constructed in accordance with the present invention. In the preferred embodiment of the present invention the carry save propagate adder is implemented to be controlled by microcode. As illustrated, the adder of FIG. 5 can be extended to operate upon any number of bits by repeating the circuitry in block 68 for each of the additional bits desired, and by connecting the additional blocks in the manner illustrated in FIG. 5 with respect to blocks 70, 72 and 74.

In FIG. 5, certain symbols are used which merit some explanation at this time. At the upper left-hand corner of the Figure, the "T" shaped symbol 76 represents connection to the power supply for the device. Just below that symbol, the two parallel, vertical lines, one shorter than the other with the shorter line being bisected at right angles by a horizontal line, indicate a transistor gate. This symbol, for example gate 78, is utilized throughout the schematic to represent a transistor switch which, when activated by a signal on the bisecting line, will cause a signal path to be provided along the longer parallel line. Below gate 78 is illustrated an arrowhead 80. This symbol represents circuit common.

When a particular line is fed to other parts of the circuit, or to the other adder blocks, e.g. 70, 72 and 74, such connection is indicated by extending the line through the particular elements to which it connects. For example, the line 88, labeled C.S. SHIFT (0,5), connects to and through gate 82, then to and through circuits within adder block 70, then to and through circuits within adder block 72, and finally to circuits in adder block 74. Thus, referring to the bottom right-hand corner of FIG. 5, the carry-save out line is shown extending through adder blocks 68, 70, 72 and 74 and as connecting to certain portions of the circuits therein.

Similarly, a carry chain is shown extending through blocks 70, 72 and 74, by way of controlled gates, such as transistor 40, which regulate the propagation of the carry signal through carry propagate outputs $CPO_N$, $CPO_{N-1}$, $CPO_{N-2}$, etc.

Referring to the upper left-hand corner of FIG. 5, a number of control lines are shown in addition to the control lines and the carry-propagate input line described in conjunction with FIGS. 2-4. Line 84 is labeled CARRY IN PRECHARGE (2,3). This line receives a signal which causes node 16 to be precharged prior to the actual application of the carry-in signal to line 46. As mentioned earlier, when metal oxide semiconductor structures are used in implementing the adder of the present invention, precharging selected nodes in the data path assist in increasing the speed of the adder circuitry. Discharging a precharged line can be accomplished more quickly than charging a line which is originally at a logic zero potential. In the carry propagate input path node 16 is precharged to a logic one state and discharged if the logic state of the carry propagate input, line 46, is a logic zero.

Figure 6:
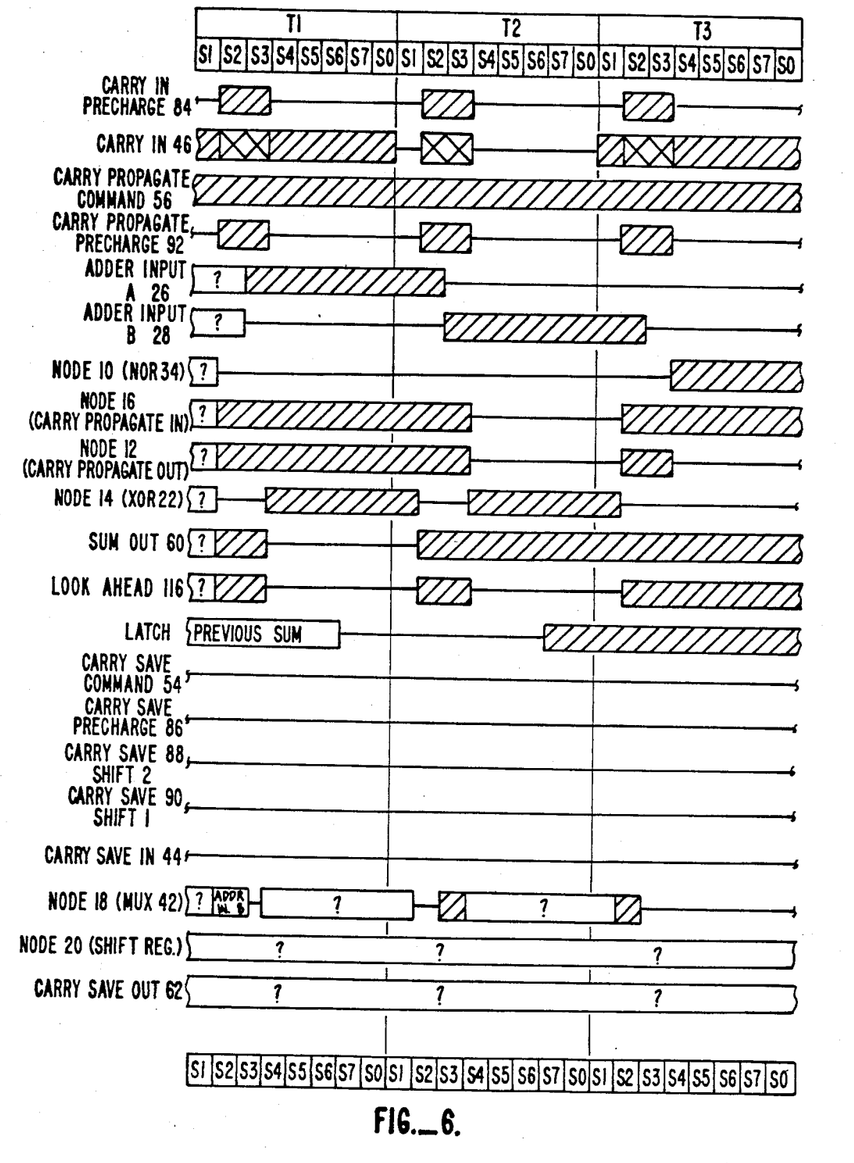
FIG. 6 is a timing diagram which illustrates the operation of the present invention when in the carry-propagate mode.
Figure 7:
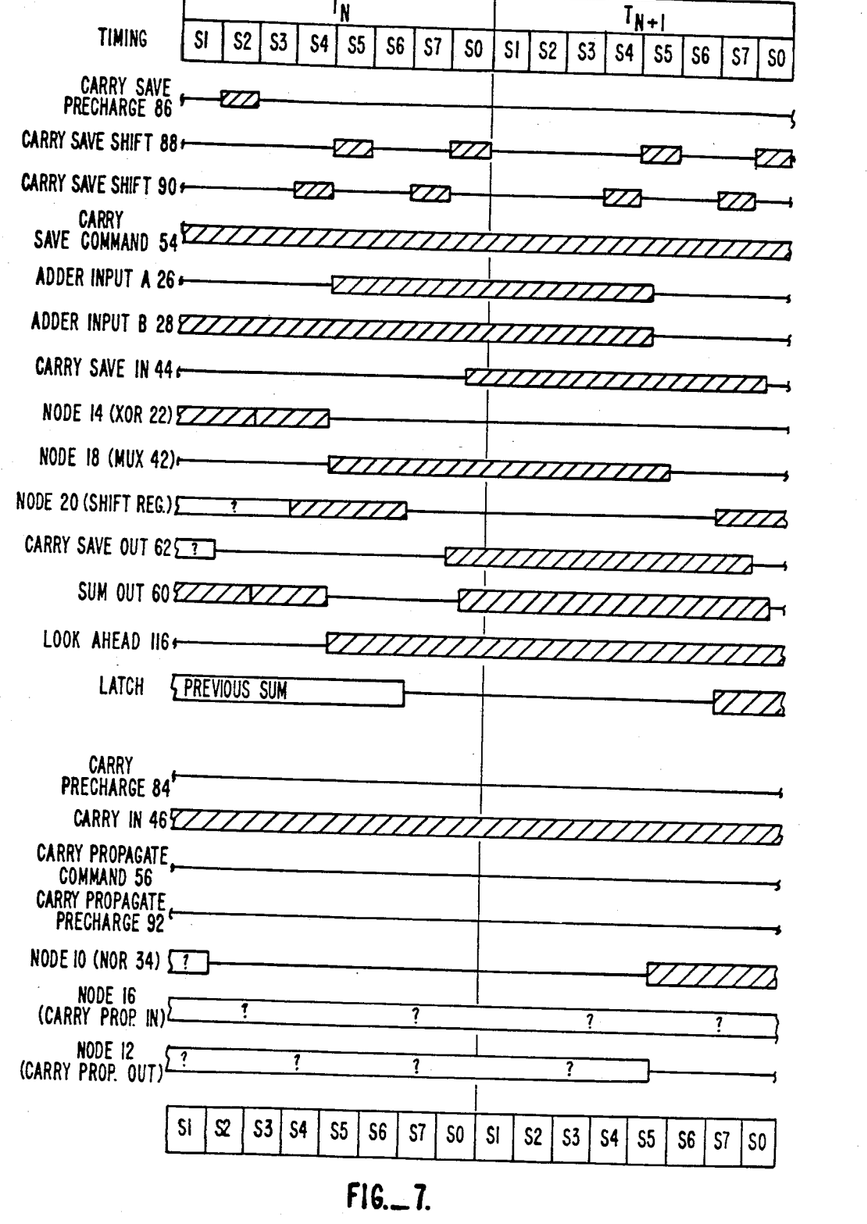
FIG. 7 is a timing diagram which illustrates the operation of the present invention when in the carry-save mode.

The notation (2,3) refers to subdivisions of a machine cycle T. In the preferred embodiment of the present invention there are eight such subdivisions within a period T. These are numbered 0-7. In the explanation to follow, it is to be understood that subperiod 1 is the first subperiod in the period T, and subperiod 0 is the last subperiod therein. Thus, line 84 will be activated during subperiods 2 and 3 to cause a precharging of the carry-propagate input circuitry during that time period. Reference is made to FIGS. 6 and 7 and the waveforms labeled TIMING, which illustrate the subdivision of the machine periods T into subperiods.

Line 86 is labeled C.S. PRECHARGE (2). This corresponds to the discharging of the carry-save output during subperiod 2, if commanded to do so by the appropriate logic state applied to it by the microcode. Thus, during subperiod 2, all of the carry-save outputs in the bank of adder blocks shown in FIG. 5 will be discharged.

Line 88 is labeled C.S. SHIFT (0,5). This is a control line to shift register 64 which causes information to be shifted to the output of the shift register during subperiods 0 and 5. Line 90 is labeled C.S. SHIFT (4,7). This line controls shift register 64 to cause data to be shifted into the shift register during subperiods 4 and 7.

Finally, line 92 is labeled C.P. CTRL (2,3). This line is activated when the present invention is in the carry-propagate mode. As can be seen from FIG. 5 signals applied to line 92 are also received at the inputs to NOR gate 34 and NOR gate 36 of exclusive-OR block 22. This causes outputs 32 and 30 respectively to be disabled during the precharge subperiods 2 and 3. In turn, this causes devices 40 and 114 to be off during this period and to allow the precharging of node 12.

When the present invention is in the carry-save mode, line 92 remains deactivated through the entire period T. As can be seen from FIG. 5, the logic state of node 12 determines the logic state of carry-propagate output 48.

Referring to the upper right-hand corner of FIG. 5, in addition to the carry-save output and the sum output, the adder of the present invention also provides a carry-look ahead output which has been inverted. This output is provided from each of the blocks 70, 72 and 74, and is intended for use by a carry-look ahead circuit to assist in speeding up the propagation of a carry through the adder when the adder is in a carry-propagate mode.

Referring now to multiplexer 42, it can be seen that the multiplexer is constructed from two transistor switches 94 and 96. Transistor switch 94 controls the application of adder input $B_N$ to node 18. Transistor switch 96 controls the application of the carry-save input, line 44, to node 18. Transistor switch 94 is controlled by the inverted logic state from exclusive-OR block 22, while transistor switch 96 is controlled directly by the output of exclusive-OR block 22. Thus, only one of the input signals, adder input $B_N$ or carry-save input, propagates into shift register 64 at any one time.

Multiplexer 52 is constructed in a similar manner, except that the carry-save add command and the carry-propagate add command are applied on independent lines, i.e. line 54 and 56 respectively. In this case, carry-propagate command, on line 56, controls transistor switch 98, which in turn directs the carry-propagate input signal to input 58 of exclusive-OR block 24. Similarly, the carry-save command, on line 54, controls transistor switch 100, which routes the carry-save input, line 44, to input 58 of exclusive-OR block 24.

Shift register 64 is formed by transistor switches 82 and 102, inverters 104 and 106, and precharge arrangement 108.

As discussed above, precharge arrangement 108 discharges the carry-save output under control of the carry-save precharge line 86 during the initialization of the carry save adder circuitry. Inverter 104 receives a signal from the output of multiplexer 42 as controlled by transistor switch 102. Transistor switch 102, in turn, is controlled by carry-save shift line 90. Thus, during subperiods 4 and 7, transistor switch 102 is activated to connect the output of multiplexer 42 to the input of inverter 104. Inverter 104 inverts the signal applied to it and provides such signal to the input of inverter 106 under the control of transistor switch 82. Transistor switch 82 is controlled by signals on carry-save shift line 88. Thus, during subperiods 0 and 5, transistor switch 82 is activated to apply the output of inverter 104 to the input of inverter 106.

Shift register 64 thus shifts two bits of information sequentially from multiplexer 42 to the carry-save output during the subperiods 4, 5, 6, 7, and 0.

Finally, referring to the center portion of FIG. 5, the carry-propagate circuitry will be described in greater detail. As described earlier in connection with FIG. 2, the carry-propagate signal received from carry-propagate input 46 is passed to the carry-propagate output 48 depending upon the output state of exclusive-OR block 22. Transistor switch 40 controls the propagation of the carry-signal along the carry-propagate line 110. When the output of exclusive-OR block 22 is a logic zero, the data path along line 110 is opened by transistor switch 40. On the other hand, when the output of exclusive-OR function 22 is a logic one, transistor switch 40 maintains continuity along line 110.

When the output of exclusive-OR function 22 is a logic zero the state of carry-propagate output is determined by gate 50 and precharge circuit 66. Gate 50 is controlled by output 32 from NOR gate 34. As discussed earlier, precharge circuit 66 precharges node 12 to a logic one level during subperiods 2 and 3 of each period T. This is done by activating transistor switch 112 so that node 12 is connected to the power supply during the two subperiods.

During the precharge periods 2 and 3, NOR gate 34 assumes a logic zero level. This is because NOR gate 34 receives as one of its inputs the logic state on line 92, the carry-propagate control precharge line. After subperiod 3, the output of NOR gate 34 is controlled by the logic states of adder input A and adder input B. The output of exclusive-OR block 22 will be the logic zero whenever adder input A is equal to adder input B, i.e. both are a logic one state or both are a logic zero state.

When both adder input A and adder input B are at a logic one state, transistor switch 40 is off and the output of NOR gate 34 is a logic zero. Thus output 32 will be at a logic zero state and will pprevent transistor switch 114 from being activated. Transistor switch 114 controls the connection of node 12 to the circuit common. Because transistor switch 40 is open, node 12 will be discharged to a logic zero level only when transistor switch 114 is activated. At all other times, following the precharge by transistor switch 112, node 12 will remain at a logic one level.

On the other hand, when adder input A and adder input B are both at a logic zero level transistor switch 40 is off and the output of NOR gate 34 will be at a logic one level. This will cause transistor switch 114 to be activated and thus node 12 to be discharged to a logic zero level. As discussed earlier, this provides the correct logic output level at the carry-propagate output 48.

Referring now to FIGS. 6 and 7, the operation of the present invention will now be described in greater detail. FIG. 6 illustrates the operation of the invention when in the carry-propagate mode, while FIG. 7 illustrates the operation of the invention while in a carry-save mode.

Referring to FIG. 6, the left-hand portion of the Figure defines each waveform and specifies the line upon which the waveform appears. The solid line indicates a logic zero state while a cross-hatched block indicates a logic one state. A block having "XX" through it indicates a disabled state and a block having a "?" in it indicates an unknown state. Finally, a block having a label therein has a logic value defined by the indicated data source. The unknown state is used herein so that previous adder states need not be defined, and, as such to simplify the present description.

Carry-Propagate Operation

For period $T_1$, the adder is in a carry-propagate mode, i.e. carry-propagate control line 56 is at a logic one level; with a carry-propagate IN of a logic one level, see carry-in 46; an adder input A value of logic one, see adder input A 26; and an adder input B value of logic zero, see adder input B 28.

T1/Subperiod 1

During subperiod 1 a logic one level is present on the carry-propagate IN line 46, the carry-propagate control line 56 is at a logic one level, and the adder input A 26 and adder input B 28 are unknown, it being assumed that the previous period $T_0$ is an unknown state. The logic states of nodes 10, 12, 14, 16 and sum out 60 and look ahead output 116 are all unknown.

T1/Subperiod 2

During subperiod 2 carry precharge line 84 is activated, carry propagate IN line 46 is disabled, and the carry-propagate precharge line 92 is activated. Adder input A and adder input B are both shown as unknown during this period because it is during subperiods 2 and 3, in the preferred embodiment of the present invention, where the current adder input values are being set and permitted to stabilize. Thus for purposes of this illustration adder input A and adder input B are both indicated as unknown during period 2.

At this time, node 10 assumes a logic zero level. This is because the carry-propagate control line 92 is at a logic one level which causes the output of NOR gate 34, i.e. node 10, to assume a logic zero level.

Node 16 is at a logic one level during this time because the carry-propagate input line 46 is disabled and the carry-in precharge line 84 is activated. Thus power source 76 is connected to charge node 16 to a logic one level.

During this period node 14 is at a logic zero level. This is because carry-propagate control line 92 is at a logic one level and is connected to the input of NOR gate 36. As such, the output of NOR gate 36, i.e. line 30 and node 14, will be at a logic zero level.

During this time period node 12 is at a logic one level because the output of NOR gate 34, i.e. node 10, is at a logic zero level, thus deactivating transistor switch 114; and because carry-propagate control line 92 is at a logic one level, thus activating transistor switch 112. Node 12 is thus connected to the power supply to precharge the node to a logic one level.

Node 18, during this time period, will assume a value corresponding to adder input B. This is because the logic zero level of the output from exclusive-OR block 22 causes transistor switch 94 to be activated. This connects adder input B to node 18 of multiplexer 42. Since adder input B is not settled during this period, no specific logic value can be given.

T1/Subperiod 3

During subperiod 3 the carry precharge line 84 continues at a logic one level, the carry-propagate IN line 46 continues disabled, and additionally, the precharge for carry-propagate line 92 remains at a logic one level. During this time period adder input A is shown to stabilize at a logic one level and adder input B is shown to stabilize at a logic zero level. All other lines and nodes retain their previous values.

T1/Subperiod 4

During subperiod 4, the carry in precharge line 84 reverts to a logic zero level, the carry-propagate IN line 46 becomes enabled, and the precharge for carry-propagate line 92 reverts to a logic zero level. When the precharge for carry-propagate line 92 reverts to a logic zero level, exclusive-OR block 22 becomes enabled. In turn, the output of exclusive-OR block 22 assumes a logic state which is representative of an exclusive-OR operation on adder input A and adder input B.

Similarly, when carry precharge line 84 reverts to a logic one level, and the carry-propagate IN line 46 becomes enabled and the logic state of the carry-propagate input line 110 will be set.

Where the carry-propagate IN is a logic one level, inverter 118 will apply a logic zero level to transistor switch 120. This causes a logic one state to be retained on carry-propagate input line 110. On the other hand when the carry-propagate IN signal is a logic zero, inverter 118 applies a logic one state to transistor switch 120. This causes the carry-propagate input line 110 to be connected to ground and thus to discharge the line and cause a logic zero state to be placed on line 110. This can be seen in FIG. 6.

Also seen in FIG. 6 during subperiod 4, is that node 16 assumes a logic one state, and that node 14 goes to a logic one state. With respect to node 10 the logical NOR of adder input A and adder input B is a logic zero. With respect to node 16, a logic one level remains, since the carry-propagate input signal on line 46 is a logic one level, thus deactivating transistor switch 120.

With respect to node 14, the logic exclusive-OR of adder input A and adder input B is a logic one. With respect to node 12, because the output of NOR 34, see node 10, is a logic zero state, node 12 remains at its precharged logic one level.

Sum output 60 reverts to a logic zero level during subperiod 4. This is because the exclusive-OR operation on the logic one level from exclusive-OR block 22 and a logic one level from carry-propagate input 46, see node 16, is a logic zero.

T1/Subperiods 5,6

During subperiods 5-6, the carry-propagate circuitry is inactive.

T1/Subperiod 7

During the transition between subperiod 6 and 7, the logic state of the sum output 60 is latched in a latch circuit, not shown.

T1/Subperiod 0

Finally, during the transition from subperiod 0 to T2/Subperiod 1, the next carry propagate in is received on line 46 from the next lower adder block.

T2/T3

FIG. 6 also shows the waveforms for the various lines during a period $T_2$ and a period $T_3$. During period $T_2$ adder input A is at a logic zero level and adder input B is at a logic one level. Also, the carry-propagate IN is at a logic zero state. An examination of the waveforms during this period will indicate the manner in which the signals on nodes 10, 12, 14, and 16 change, and the resulting effect on the sum output and the carry-propagate output.

In period $T_3$, the carry-propagate input on line 46 reverts back to a logic one level and adder input A and adder input B both assume a logic zero level. It is to be noted that in this period, during subperiod 4, node 12 is forced to a logic zero level by the presence of a logic one level at node 10. It is also to be noted that the output, node 14, of exclusive-OR block 22 is at a logic zero level, thus deactivating transistor switch 40 and preventing the logic state on carry-propagate input line 110 from affecting the logic state of carry-propagate output 48.

The waveforms shown at the bottom of FIG. 6 are intended to illustrate the waveforms associated with the carry-save control lines, nodes, inputs and outputs during a carry propagate operation. During such an operation the carry save line 54, the carry save precharge line 86, the carry save shift 2 line 88, the carry save shift 1 line 90 and the carry save input line 44 are all at a logic one level. The logic state of node 18 is determined by the output of exclusive-OR block 22 and the adder input $B_N$; however, since transistor switch 100 will be off, see line 54, the logic state on node 18 will not affect the output of exclusive-OR block 24. Also, because transistor switch 102 will be off, see line 90, as will transistor switch 82, see line 88, the state of node 20 and that of carry save out 62 will be unknown.

Carry-Save Operation

Referring now to FIG. 7, the carry-save mode of the present invention will now be described in greater detail. Periods $T_N - T_{N+1}$ are illustrated. In this Figure it can be seen that the carry-save control line 54 is at a logic one level. During period $T_N$/Subperiods 1-3 adder input A is at a logic zero level and adder input B is at a logic one level. During subperiods 4, 5, 6, 7, and 0, both adder input A and B are at a logic one level. The carry-save input, line 44, is at a logic zero level during almost all of period $T_N$.

During time $T_{N+1}$/Subperiods 1-4 adder input A and adder input B are both at a logic one level, and revert to a logic zero level during subperiods 5, 6, 7, and 0. The carry-save input, line 44, assumes a logic one level during almost the entire period.

Recall that in the carry-save mode, the precharge for carry-propagate, line 92, is deactivated. Thus, for purposes of this description, attention will be paid to carry-save shift line 88, carry-save shift line 90, adder input A 26, adder input B line 28, carry-save IN line 44, node 14, node 18, node 20, carry-save output line 62, sum output line 60, and the latch. These waveforms are found in the upper portion of the Figure.

For the purposes of this explanation it is assumed that the values for the various adder input signals for subperiod 1 in time period $T_N$ is known, such that the logic states of nodes 14 and 18 are known, but that the previous logic state of node 20 is unknown such that the logic state for carry save out 62 is unknown. At this time it is also assumed that the carry-save input, line 44, is at a logic zero level. Also, since adder input A is at a logic zero level and adder input B is at a logic one level, the output of exclusive-OR block 22, node 14, assumes a logic one level. This causes multiplexer 42 to apply the logic value of the carry save input line 44, i.e. logic zero, to output node 18 and thence to shift register 64. Further, the sum out 60 will assume a logic one level since node 18 is at a logic zero level and node 14 is at a logic one level.

During subperiod 2, carry save precharge line 86 is asserted to discharge carry save out line 62.

During subperiod 3, no changes occur in the waveforms.

During subperiod 4, carry-save shift, line 90, is activated. This causes the logic value from the output of multiplexer 42 to be shifted into node 20 of shift register 64. Thus node 20 is shown assuming a logic zero level during this subperiod 4. During this time the carry-save output, line 62, remains unchanged.

During subperiod 5, adder input A changes to a logic one level and carry-save shift, line 88, is activated. This causes the inverse of the logic level at node 20 to be shifted to the output of shift register 64 via inverter 106. Thus, node 20 is shown to remain unchanged. Additionally, since carry-save OUT line 62, was previously at a logic zero level, it too is shown unchanged. Further, the change in adder input A causes node 14 to assume a logic zero state, which in turn causes node 18 to assume the logic state of adder input B. Thus the sum out 60 assumes a logic zero level at this point.

During subperiod 6, no further changes occur in the waveforms of the present invention.

However, during subperiod 7, carry-save shift, line 90, is again activated to cause the output of multiplexer 42 to be shifted into shift register 64. Since adder input A changed during the 5th subperiod, thus causing a change in the logic state of noe 18, a new carry-save value is shifted into shift register 64 during subperiod 7.

Finally, during subperiod 0, carry-save shift, line 88, is activated to cause the new internal value in shift register 64 to be shifted to carry-save output, line 62.

The waveforms of period $T_{N+1}$ shows variations in the operation of the carry-save mode of the present invention.

It is to be appreciated that in the carry save mode two addition operations can be performed, one prior to the 4th subperiod and the second prior to the 7th subperiod.

It is to be understood that with the carry-save adder portion of the present invention a multiplicity of operations can be performed during a single machine cycle. In the above discussion, two operations were performed during the single machine cycle. Alternatively, three or more such operations can be performed during a single machine cycle by appropriate application of the data to be added to the data inputs, and appropriate control of the shifting function provided by shift register 64 for the carry-save output. Thus, the binary adder of the present invention provides an adder structure which is capable of a large number of operations during a single machine cycle.

The waveforms shown at the bottom of the Figure are intended to illustrate the state of the control lines, outputs and inputs associated with the carry propagate function during the carry save operation. As can be seen from these waveforms, the carry in line 46 is set to a logic one to cause node 16 to float.

From the above it can be seen that the present invention provides a versatile yet efficient structure for a carry-save propagate adder. The carry-propagate and carry-save functions share portions of the adder circuitry to reduce the component count required to implement the circuit. Additionally, multiplexers are used in place of combinatorial logic gates and in a novel manner to further reduce the overall parts count for the circuit. As such, the carry-save propagate adder of the present invention can be implemented with smaller physical size than previous equivalent adders.

The carry-save structure discussed above is especially useful in multiplication operations. Referring to FIGS. 8A, 8B, 9, 10 and 11, an application of the carry-save propagate adder of the present invention in a multiplication operation will now be discussed.

Figure 8A:
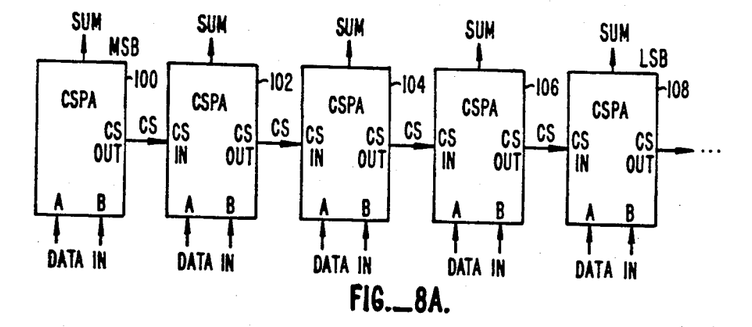
FIGS. 8A and 8B illustrate the interconnection of a plurality of carry-save propagate adders for use in a multiplication operation, with FIG. 8A illustrating the interconnection for multiplication by two bits at a time, and FIG. 8B illustrating the interconnection for multiplication by three bits at a time.

FIG. 8A illustrates a bank of carry-save propagate adders of the present invention connected to implement a multiplication operation in which the multiplicand word (MCND) is multiplied by two bits of the multiplier word (MPLR) at a time. The carry-save propagate adders are arranged to accept the most significant bit to the least significant bit from left to right. Thus, CSPA 100 accepts the most significant bit (MSB) for the operation while, assuming that five bits are involved, CSPA 108 will accept the least significant bit (LSB) of the operation. Each CSPA provides a sum output and a carry-save output. Each CSPA receives an A and a B input and a carry-save (CS) input. It is to be noted that, unlike a carry propagate configuration, the carry-save outputs are supplied to the CSPA for the next lower significant bit, i.e., to the right. The significance of this will be described in the following material.

Figure 8B:
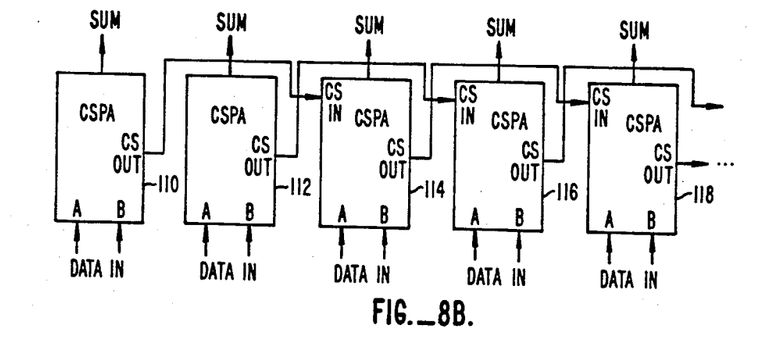

FIG. 8B illustrates the interconnection of CSPA circuits of the present invention for multiplication of the multiplicand word by three bits of the multiplier word at a time. In this structure, the same CSPA circuit is used, however, the carry-save output of a particular CSPA circuit is connected to the carry-save input of a carry-save propagate circuit two positions removed. Thus, the carry-save output for CSPA 110 is connected to the carry-save input of CSPA 114.

Generally, where N bits of the multiplier word are used to multiply the multiplicand at any one time, the carry-save output of a particular CSPA circuit will be supplied to a CSPA circuit N minus one positions toward the least significant bit.

Figure 9:
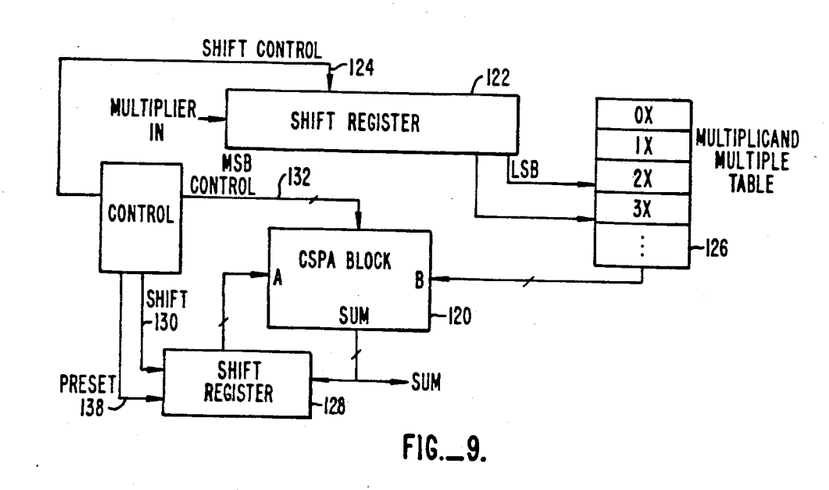
FIG. 9 is a functional illustration of the carry-save propagate adder blocks of FIGS. 8A and 8B when used in conjunction with a multiplication operation.

Referring now to FIG. 9, a multiplication operation in which two bits of the multiplier word are multiplied at one time with the multiplicand will now be discussed. The CSPA block 120 is assumed to correspond to the structure illustrated in FIG. 8A. The multiplier word is supplied to shift register 122, which shifts the word under control of shift control line 124, two bits at a time for each add operation. The two least significant bits in shift register 122 are applied to a multiplicand multiple table 126. The multiplicand multiple table 126 decodes these least two significant bits and supplies a value to the B input of CSPA block 120, which is the corresponding multiple of the multiplicand. For example, if the two least significant bits are 10, then two times the multiplicand word will be supplied to the B input of CSPA block 120. Conversely, if the two least significant bits are 00, then all 0s will be suplied to the B input of CSPA block 120 from multiplicand multiple table 126. Multiplicand multiple table 126 can be implemented in the form of a random access memory, or through the use of a decoder which controls a multiplexer. In the latter structure, the decoder will decode the value of the two least significant bits from shift register 122 and energize a corresponding control line for the multiplexer. The multiplexer will have as its inputs the various multiples of the multiplicand word. The output of the multiplexer will then be the appropriate multiplicand multiple value.

The sum output of CSPA block 120 is supplied in parallel to a shift register 128. Shift register 128 shifts the sum under control of shift line 130 a predetermined amount. In the case of the present example, the shifting is set for two positions. The shifted sum value is then applied to the A input of CSPA block 120. Control line 132 corresponds to the control lines discussed earlier in connection with FIG. 5.

Figure 10:
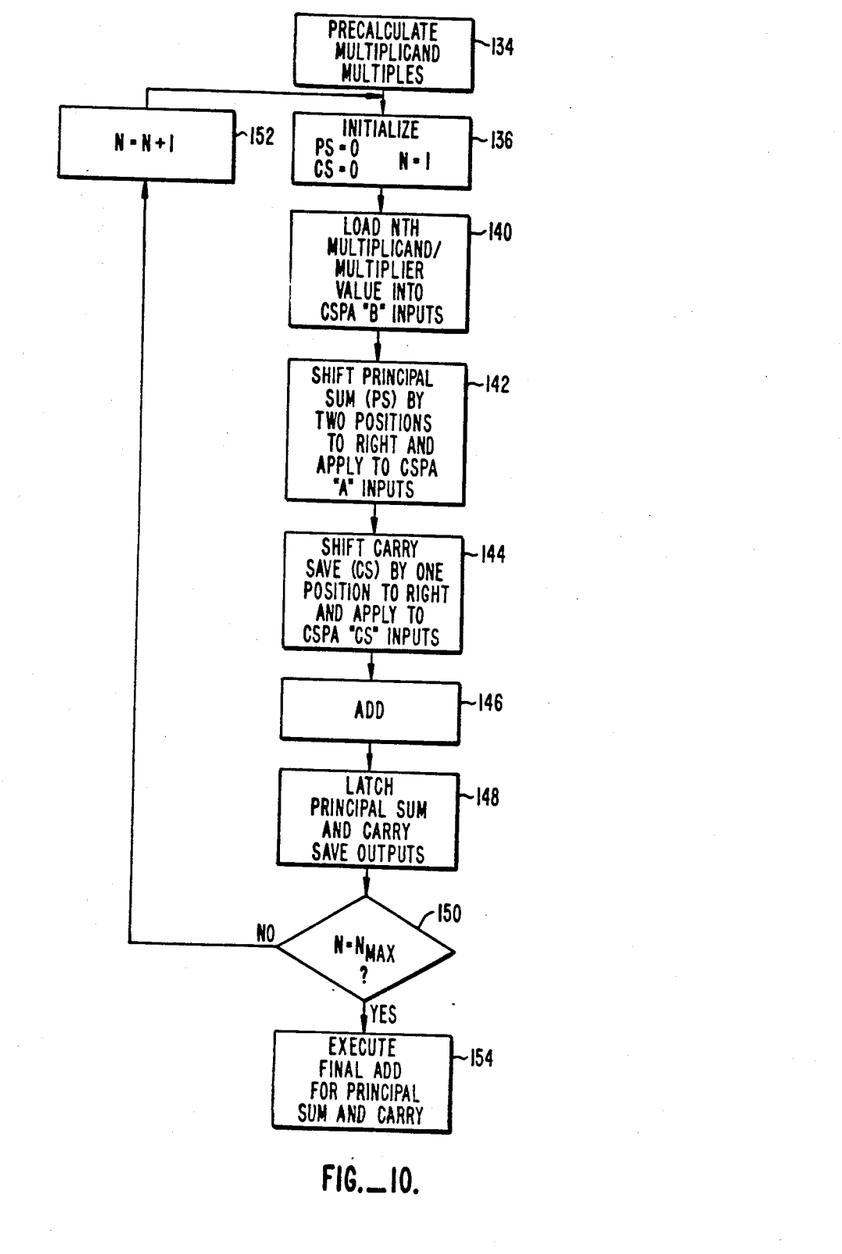
FIG. 10 is flow diagram of the multiplication technique implemented by the structures of FIGS. 8A, 8B and 9.

Referring now to FIG. 10, the technique implemented by the operation of the structure of FIG. 9 will now be described in greater detail. In step 134 of FIG. 10, the multiplicand multiples are precalculated and supplied to the multiplicand multiple table 126. In step 136, the inputs to CSPA block 120 are initialized. More specifically, shift register 128 is preset to all zeros via preset line 138, FIG. 9, and the carry-save values internal to CSPA block 120 are preset to zero via control line 132. Also, the loop counter, N is set equal to 1. In step 140 the Nth multiplicand/multiplier value is applied to the B inputs of CSPA block 120. In step 142 the principle sum (PS), or sum, resident in shift register 128 is shifted two positions to the right and applied to the A inputs of CSPA block 120. In step 144 the carry-save bits are shifted one position to the right and applied to the carry-save inputs of CSPA block 120, internally. In step 146 the add operation is permitted to occur. In step 148 the principle sum (PS), or sum output, and the carry-save outputs are stored. With respect to the principle sum output, this is loaded into shift register 128, while the carry-save outputs are retained internally to the CSPA block, such as in shift register 64, FIG. 2. In step 150 it is determined whether any further bits of the multiplier word remain to be multiplied. If so, the loop counter is incremented in step 152 and the process, starting at 136, is repeated. If, in step 150, all of the multiplier word bits have been multiplied, step 154 is executed to execute the final add of the principle sum and carry words.

With respect to step 144, the shifting of the carry-save is accomplished internally to the CSPA block 120. This can be seen in FIG. 8A, wherein the carry-save output of a particular block is supplied to the carry-save input for the next lower block in significance. This is the equivalent of shifting the carry-save word one position to the left, because the carry word represents carry bits, and the shifting of the carry-save word two positions to the right, in order that the next adder operation can be properly combined with the previous adder operation in the overall multiplication operation. The net amount of shifting of the carry-save word is thus one position to the right.

The reasons for the above shifting will be better appreciated upon consideration of FIG. 11 and the following discussion. FIG. 11 illustrates a multiplication of multiplicand word 1001 with multiplier word 1011. In the upper right-hand corner of the figure, the values in multiplicand multiple table 126 are shown.

In the first add operation, i.e., the first loop through the flow diagram of FIG. 10, step 140 of FIG. 10 is implemented by looking at bits y2 and y3 of the multiplier word. It can be seen that these bits are 11. When these bits are multiplied with the multiplicand, the result is a multiplicand value which is three times the multiplicand word. Thus, the three "x" multiplicand multiple value is applied to the B input of CSPA block 120. This is shown in the right-hand side of FIG. 11. The initilization of the sum in shift register 128 and the internal carry-save values, step 136, is shown in the form of all zeros for the $CS_i$ and the cap A positions of FIG. 11. The results of the add step 146, FIG. 10, are shown as cap $PS_0$ and $CS_0$. In the first add operation $PS_0$ is 11011 and $CS_0$ is 00000.

In the shift/second add operation, the second multiplicand/multiplier value is selected. This is done by examining bits y0 and y1 of the multiplier word. This corresponds to a 10 or two times value of the multiplicand word. Thus, 10010 is applied to the B inputs of the CSPA block 120. With respect to the carry-save input, it can be seen that the carry-save word from the previous operation, 00000 is shifted one position to the right. With respect to the principle sum word, the principle sum from the first add operation is shifted by two positions to the right. The resulting principle sum output is thus 1010011 and the carry-save output is thus 0001000.

Finally, final step 154 is executed to obtain a resulting value of 1100011.

From the above example, it can be seen that the shifting of the principle sum and the carry-save inputs for the next addition operation in conventional longhand multiplication. The words are shifted two positions to the right because the multiplication is accomplished by multiplying two bits at a time, as opposed to the conventional one bit at a time. It is to be understood that other groupings of bits can be chosen for multiplication at one time. For example, three bits of the multiplier word can be used to multiply the multiplicand word at any one time. In such case, the struture of FIG. 8B is utilized and the timing of the control signal to each CSPA circuit will be modified accordingly.

Where three bits of the multiplier word are desired to be used at one time, the CSPA circuitry can be interconnected as in FIG. 8B. Further, table 126 will contain multiples of the multiplicand word from zero through seven. Additionally, the multiplier word will be shifted through shift register 122 three positions for each operation, while the table 126 will be addressed by the three least significant bits in shift register 122. Also, the pricipal sum output from CSPA block 120 will be shifted three positions to the right before being applied to the A inputs of CSPA block 120.

From the above it can be seen that the present invention permits the execution of a multiplication operation in a highly efficient manner.

The terms and expressions which have been employed here are used as terms of description and not of limitations, and there is no intention, in the use of such terms and expressions of excluding equivalence of the features shown and described, or portions thereof, it being recognized that various modifications are possible within the scope of the invention claimed.

We claim:

1. A binary adder for adding a first bit, a second bit, and a carry bit of binary data to provide a sum output and a carry propagate output, comprising
    first logic means receiving the first and second bits of binary data for providing an output which is the logical exclusive-OR thereof, wherein the first logic means include
    third logic means responsive to the first and second bits of binary data for providing an output which is a logical NOR thereof;
    second logic means receiving the carry bit and coupled to the output of the first logic means for providing the sum output, wherein the sum output is the logical exclusive-OR of the carry bit and the output of the first logic means;
    switch means receiving the carry bit and coupled to the first logic means for propagation the carry bit as a function of the logic state of the output of the first logic means; and
    propagate output means coupled to the switch means and to the third logic means for providing the carry propagate output wherein the switch means propagates the carry bit as a function of the logic state of the output of the first logic means and as a function of the logic state of the output of the third logic means.

2. The binary adder of claim 1 wherein the first switch means include a solid state switch.

3. The binary adder of claim 1 wherein the second switch means include a solid state switch.

4. The binary adder of claim 1 wherein said binary adder is constructed of metal oxide semiconductor devices and further wherein the propagate output means include
    means for precharging the state of the carry-propagate output prior to a predetermined output time; and
    means coupled to the carry-propagate output for discharging said carry-propagate output prior to the predetermined output time as a function of the output of the third logic means.

5. The binary adder of claim 4 wherein the carry-propagate output is precharged to a logic one state and further wherein the propagate output means comprise a transistor switch connected between the carry-propagate output and ground, said transistor switch being closed when the output of the third logic means is at a logic one state.

6. A binary adder for adding a first bit and a second bit of binary information with a carry-save bit in a selectable carry-save addition operation or with a carry-propagate in a selectable carry-propagate addition operation, wherein the adder provides a sum output, and a carry-save output when the carry-save addition operation is selected in response to a carry-save command, or a carry-propagate output when the carry-propagate addition operation is selected in response to a carry-propagate command, the binary adder comprising
    first logic means coupled to receive the first and second bits of binary information for providing an output which is the logical exclusive-OR of said first and second bits, and including means for providing an output which is the logical NOR of said first and second bits;
    first multiplexer means responsive to the carry-save and carry-propagate commands and coupled to receive the carry-save bit and the carry-propagate bit for providing the carry-save bit as an output in the presence of the carry-save command and the carry-propagate bit as an output in the presence of the carry-propagate command;
    second multiplexer means coupled to the first logic means and coupled to receive one of the first and second bits of binary data and to receive the carry-save bit of binary data for providing the one of the first and second bits, or the carry-save bit, as the carry-save output as controlled by the logic state of the output of the first logic means;

second logic means coupled to the first logic means and to the first multiplexer means for providing the sum output, wherein the sum output is the logical exclusive-OR of the output of the first logic means and the output of the first multiplexer means; and carry-propagate output means coupled to the first logic means and to receive the carry-propagate bit for supplying either the carry-propagate bit or predetermined logic states as the carry-propagate output as a function of the logic states of the outputs of the logic NOR means and the first logic means.

7. The binary adder of claim 6 wherein the carry-propagate output means provide the carry-propagate bit as the carry-propagate output when the output of the logical NOR means is a logic zero and the output of the first logic means is a logic one, provide a logic zero as the carry-propagate output when the output of the logical NOR means is a logic one, and provide a logic one as the carry-propagate output when the output of the logical NOR means is a logic zero and the output of the first logic means is a logic zero.

8. The binary adder of claim 6 wherein the first multiplexer means include first switch means controlled by the carry-save command for coupling the carry-save bit to the second logic means; and second switch means controlled by the carry-propagate command for coupling the carry-propagate bit to the second logic means.

9. The binary adder of claim 6 wherein the second multiplexer means include third switch means controlled by the output of the first logic means for coupling the carry-save bit to the carry-save output;

means coupled to the first logic means for inverting the output of the first logic means; and fourth switch means controlled by the inverted output of the first logic means for coupling the one of the first and second bits to the carry-save output.

10. A multiplying apparatus in which a first binary word and a second binary word are operated upon in a multiplication operation, wherein the multiplying apparatus includes first means responsive to a shift control signal for receiving and shifting the first binary word, wherein a selected number of the least significant bits in the first means are provided as an ouptut;

table means responsive to the output of the first means for storing multiples of the second binary word for outputting a multiple of the second binary word which multiple corresponds to the value of the output of the first means;

carry-save adder means responsive to the output of the table means and to a second input word for providing a sum output;

second means receiving the sum output from the carry-save adder menas for shifting said sum output a predetermined number of positions, wherein said shifted sum output is supplied as the second input word to the carry-save adder means, wherein the carry-save adder means include a plurality of binary adders, each comprising first logic means receiving first and second bits of binary-data for generating an output which is representative of a boolean exclusive-OR logical operation upon the first and second bits of binary data;

selecting means receiving one of the first and second bits of binary-data and a carry bit of binary data and coupled to the first logic means for generating the carry-save output, wherein the carry-save output is selected from either the carry bit or the one of the first and second bits of binary data as a function of the logical value of the output of the first logic means; and second logic means receiving the carry bit and coupled to the first logic means for generating the sum output, wherein the sum output is representative of a boolean exclusive-OR logical operation upon the output of the first means and the carry bit;

wherein the plurality of binary adders are ordered in a series from most significant to least significant, and the most significant adder receives the most significant bit from the shifted sum output and the selected multiple of the second binary word, and wherein the binary addders of lesser signifigance receive corresponding lesser significant bits from the shifted sum output and the selected multiple of the second binary word; and further wherein each binary adder receives a carry-save input from a binary adder which is at a predetermined position below it; wherein the predetermined position is a function of the number of bits which are multiplied at one time, from the first binary word, with the second binary word; and control means for supplying control signals to the plurality of binary adder means, and the first and second means carry-save adder means include a plurality of binary adders, each comprising first logic means receiving first and second bits of binary data for generating an output which is representative of a boolean exclusive-OR logical operation upon the first and second bits of binary data; selecting means receiving one of the first and second bits of binary-data and the carry bit of binary and coupled to the first logic means for generating the carry-save output, wherein the carry-save output is selected from either the carry bit or the one of the first and second bits of binary data as a function of the logical value of the output of the first logic means; and second logic means receiving the carry bit and coupled to the first logic means for generating the sum output, wherein the sum output is representative of a boolean exclusive-OR logical operation upon the output of the first means and the carry bit; wherein the plurality of binary adders are ordered in a series from most significant to least significant, and the most significant adder receives the most significant bit from the shifted sum output and the selected multiple of the second binary word, and wherein the binary adders of lesser significance receive corresponding lesser significant bits from the shifted sum output and the selected multiple of the second binary word; and further wherein each binary adder receives a carry-save output from a binary adder which is at a predetermined position below it; wherein the predetermined position is a function of the number of bits which are multiplied at one time, from the first binary word, with the second binary word.

* * * * *